US007759410B2

(12) United States Patent
Hochi

(10) Patent No.: US 7,759,410 B2
(45) Date of Patent: *Jul. 20, 2010

(54) RUBBER COMPOSITION FOR SIDEWALL AND TIRE HAVING A SIDEWALL USING SAME

(75) Inventor: Kazuo Hochi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/224,331

(22) PCT Filed: May 14, 2007

(86) PCT No.: PCT/JP2007/059861

§ 371 (c)(1),
(2), (4) Date: Aug. 25, 2008

(87) PCT Pub. No.: WO2007/132810

PCT Pub. Date: Nov. 22, 2007

(65) Prior Publication Data

US 2009/0008016 A1 Jan. 8, 2009

(30) Foreign Application Priority Data

May 17, 2006 (JP) .............................. 2006-137863

(51) Int. Cl.
*C08J 5/14* (2006.01)
*B60C 1/00* (2006.01)
(52) U.S. Cl. ...................................... 523/155; 524/496
(58) Field of Classification Search .................. 523/155
See application file for complete search history.

(56) References Cited

U.S. PATENT DOCUMENTS

| 5,861,454 A | 1/1999 | Ikeda et al. |
| 6,013,737 A * | 1/2000 | Takagishi et al. ........ 525/332.7 |
| 6,939,526 B2 * | 9/2005 | Fukuda et al. .............. 423/448 |

| 2003/0100661 A1 | 5/2003 | Kikuchi et al. |
| 2006/0167165 A1 | 7/2006 | Hirayama et al. |
| 2006/0183840 A1 * | 8/2006 | Hirayama et al. ........... 524/493 |
| 2006/0205858 A1 | 9/2006 | Hirayama et al. |

FOREIGN PATENT DOCUMENTS

| EP | 1508590 A1 | | 2/2005 |
| JP | 3-115336 A | | 5/1991 |
| JP | 07-102120 | | 4/1995 |
| JP | 2001316526 A | * | 11/2001 |
| JP | 2003-26858 A | | 1/2003 |
| JP | 2003-63206 A | | 3/2003 |
| JP | 2004269587 A | * | 9/2004 |
| JP | 2005-048102 | | 2/2005 |
| JP | 2005-120147 A | | 5/2005 |
| JP | 2005-280534 A | | 10/2005 |
| JP | 2005-325308 A | | 11/2005 |
| JP | 2006-22186 A | | 1/2006 |
| JP | 2006-70093 A | | 3/2006 |
| JP | 2006-89526 A | | 4/2006 |
| JP | 2006-199858 A | | 8/2006 |
| JP | 2006-219631 A | | 8/2006 |
| JP | 2006-249147 A | | 9/2006 |

OTHER PUBLICATIONS

Translation of JP 2001316526, Nov. 2001.*
Translation of JP 2004269587, Sep. 2004.*
Japanese Office Action dated Mar. 16, 2010, for JP 2007-127836 with English Translation.

* cited by examiner

*Primary Examiner*—Ling-Siu Choi
*Assistant Examiner*—Hui Chin
(74) *Attorney, Agent, or Firm*—Birch, Stewart, Kolasch & Birch, LLP

(57) ABSTRACT

There is provided a rubber composition for a sidewall, use of which makes it possible to consider an effect on environment, prepare for decrease in petroleum supply in future and further improve tear strength, flex crack growth resistance and weather resistance. The rubber composition comprises 15 to 120 parts by weight of a white filler and 5 to 50 parts by weight of graphite having an average particle diameter of 3 to 50 μm on the basis of 100 parts by weight of a rubber component comprising a natural rubber in an amount of not less than 30% by weight.

6 Claims, No Drawings

RUBBER COMPOSITION FOR SIDEWALL AND TIRE HAVING A SIDEWALL USING SAME

TECHNICAL FIELD

The present invention relates to a rubber composition for a sidewall and a tire having a sidewall using it.

BACKGROUND ART

As a rubber composition used for a sidewall of a tire, a butadiene rubber (BR) has been blended for improving flex crack growth resistance in addition to a natural rubber (NR) exhibiting superior tear strength, and further, a carbon black has been used for improving weather resistance and reinforcing property.

However, environmental problems have been recently emphasized and regulations on $CO_2$ emission have been made more rigorous. Further, since petroleum resources are finite and its supply quantity has been reduced year by year, petroleum price is predicted to surge in future and there is a limit in using raw materials derived from petroleum resources such as a BR and carbon black. Consequently, considering depletion of petroleum in future, it is necessary to use resources other than petroleum such as a NR and white fillers such as silica and calcium carbonate. However, if resources other than petroleum are used, properties such as flex crack growth resistance and reinforcing property are remarkably deteriorated compared with the case of using petroleum resources. Thus, even if resources other than petroleum are used, there are required equal or better properties such as flex crack growth resistance and reinforcing property compared with the case of petroleum resources having been used.

JP2003-63206A discloses raw materials for a tire assuming depletion of petroleum, but does not disclose a rubber composition for a sidewall that exhibits adequate flex resistance, reinforcing property and weather resistance.

DISCLOSURE OF INVENTION

It is an object of the present invention to provide a rubber composition for a sidewall, use of which makes it possible to consider an effect on environment, prepare for decrease in supply of petroleum resources and improve tear strength, flex crack growth resistance and weather resistance, and a tire having a sidewall prepared by using it.

The present invention relates to a rubber composition for a sidewall comprising 15 to 120 parts by weight of a white filler and 5 to 50 parts by weight of a graphite having an average particle diameter of 3 to 50 μm based on 100 parts by weight of a rubber component comprising a natural rubber in an amount of 30 to 100% by weight.

The rubber composition for a sidewall contains a silica as a white filler and a content of silica is preferably 15 to 60 parts by weight.

The rubber component contains preferably 10 to 70% by weight of an epoxidized natural rubber.

Further, the present invention relates to a tire having a sidewall using the aforementioned rubber composition for a sidewall.

BEST MODE FOR CARRYING OUT THE INVENTION

The rubber composition for a sidewall of the present invention comprises a rubber component, a white filler and a graphite.

The rubber component contains a natural rubber (NR).

As for NR, those such as RSS#3 and TSR20 that are generally used in the rubber industry can be used.

A content of NR in the rubber component is not less than 30% by weight, preferably not less than 40% by weight, more preferably not less than 50% by weight. When the content of NR is less than 30% by weight, an effect on environment cannot be considered and decrease in petroleum supply in future cannot be prepared for and further, adequate rubber strength cannot be obtained. Further, the content of NR is not more than 100% by weight, preferably not more than 90% by weight, more preferably not more than 80% by weight from the viewpoint of excellent flex crack growth resistance.

As for the rubber component, in addition to NR, there can be used together, for example, an epoxidized natural rubber (ENR), high-cis butadiene rubber (BR), butadiene rubber containing syndiotactic polybutadiene crystals (SPB-containing BR), styrene-butadiene rubber (SBR), butyl rubber (IIR), halogenated butyl rubber (X-IIR), and a halogenated product of a copolymer of isomonoolefin and p-alkylstyrene. Among these, ENR is preferable because environment can be considered, decrease in supply of petroleum resources in future can also be prepared for, and excellent durability can be exhibited.

As for ENR, a commercially available ENR may be used and NR may be epoxidized and used. A method of epoxidizing NR is not particularly limited and examples are methods such as a chlorohydrin method, a direct oxidation method, a hydrogen peroxide method, an alkylhydroperoxide method and a peracid method. Example of the peracid method is a method of reacting NR with an organic peracid such as peracetic acid or performic acid.

A content of ENR in the rubber component is preferably not less than 10% by weight, more preferably not less than 20% by weight from the viewpoint of excellent flex crack growth resistance. Further, the content of ENR is preferably not more than 70% by weight, more preferably not more than 60% by weight, further preferably not more than 50% by weight from the viewpoint that an adequate rubber strength can be obtained.

As for white fillers, there can be used fillers that are generally used in the rubber industry, for example, silica, calcium carbonate, mica such as sericite, aluminum hydroxide, magnesium oxide, magnesium hydroxide, clay, talc, alumina and titanium oxide. Among these, silica and/or calcium carbonate are preferable because they are superior in reinforcing property. Further, as a reinforcing filler, a carbon black is generally known, but is not appropriate for the object of the present invention, that is to consider environment and to prepare for decrease in petroleum supply in future. Further, when carbon black is used, rolling resistance is increased. Therefore it is preferable that a carbon black is not contained.

A silica is not particularly limited, and those prepared by a dry process or a wet process and usually used in the rubber industry can be used.

When a silica is contained as the white filler, a content of silica is preferably not less than 15 parts by weight, more preferably not less than 20 parts by weight based on 100 parts by weight of the rubber component because an effect on environment can be considered, decrease in petroleum supply in future can be prepared for, and tear strength can be enhanced, so a crack is hardly caused even when the tire gets contact with an obstacle during running. Further, the content of silica is preferably not more than 60 parts by weight, more preferably not more than 50 parts by weight from the viewpoint of excellent flex crack growth resistance.

Calcium carbonate is not particularly limited and those usually used in the rubber industry can be used.

When calcium carbonate is contained as the white filler, a content of calcium carbonate is preferably not less than 5 parts by weight, more preferably not less than 10 parts by weight based on 100 parts by weight of the rubber component from the viewpoint of low cost. Further, the content of calcium carbonate is preferably not more than 150 parts by weight, more preferably not more than 120 parts by weight from the viewpoint of excellent strength.

The total content of white fillers is not less than 15 parts by weight, preferably not less than 30 parts by weight based on 100 parts by weight of the rubber component. When the total content of white fillers is less than 15 parts by weight, an effect on environment cannot be considered, decrease in petroleum supply in future cannot be prepared for, and additionally, adequate tear strength cannot be obtained. Further, the total content of white fillers is not more than 120 parts by weight, preferably not more than 80 parts by weight. When the total content of white fillers exceeds 120 parts by weight, adequate flex crack growth resistance cannot be obtained.

A silane coupling agent is preferably compounded in combination with a silica for the rubber composition for a sidewall of the present invention.

As for the silane coupling agent, silane coupling agents conventionally used together with a white filler can be used and examples of silane coupling agents are sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane and 2-chloroethyltriethoxysilane.

A content of silane coupling agent is preferably not less than 2 parts by weight, more preferably not less than 4 parts by weight based on 100 parts by weight of the silica from the viewpoint of adequate flex crack growth resistance. Further, the content of silane coupling agent is preferably not more than 20 parts by weight, more preferably not more than 12 parts by weight because flex crack growth resistance can be improved adequately and cost can be reduced.

When only the white filler is contained as the filler, since the white filler has a low light shielding effect and light is easily transmitted, light reaches to an inner layer of the sidewall and deterioration of a rubber is accelerated. Although a shielding effect has been obtained by using a carbon black, it is a raw material derived from petroleum resources and is not preferable. Accordingly, in the present invention, the above-mentioned problem of the white filler can be solved by using graphite which is a non-petroleum resource and has a similar effect.

In the present invention, graphite is a cleavable graphite having a crystal structure of hexagonal plate-like form, and carbon black or the like is not contained.

An average particle diameter of graphite is not less than 3 μm, preferably not less than 5 μm. When the average particle diameter of graphite is less than 3 μm, adequate hardness cannot be obtained. Further, the average particle diameter of graphite is not more than 50 μm, preferably not more than 20 μm from the viewpoint of strength. When the average particle diameter of graphite exceeds 50 μm, graphite becomes the trigger of fracture in the rubber and tear strength and flex crack growth resistance are lowered.

A content of graphite is not less than 5 parts by weight, preferably not less than 10 parts by weight based on 100 parts by weight of the rubber component. When the content of graphite is less than 5 parts by weight, adequate weather resistance cannot be obtained. Further, the content of graphite is not more than 50 parts by weight, preferably not more than 30 parts by weight. When the content of graphite exceeds 50 parts by weight, flex crack growth resistance is lowered.

It is an object of the rubber composition for a sidewall of the present invention to consider an effect on environment and prepare for decrease in petroleum supply in future, and it is preferable that an aromatic oil is not contained.

In the rubber composition for a sidewall of the present invention, compounding agents such as wax, various antioxidants, stearic acid, zinc oxide, vulcanizing agents such as sulfur and various vulcanization accelerators which are usually used in the tire industry can be suitably compounded, in addition to the aforementioned rubber components, white fillers, silane coupling agents, graphite and a plasticizer derived from non-petroleum resources.

A content of raw materials derived from non-petroleum resources in the rubber composition for a sidewall of the present invention is preferably not less than 90% by weight, more preferably not less than 97% by weight. When the content of non-petroleum raw materials is less than 90% by weight, there is a tendency that an effect on environment cannot be considered and decrease in petroleum supply in future cannot be prepared for.

The rubber composition for a sidewall of the present invention can be prepared by usual methods. Namely, the aforementioned rubber component, white filler, graphite and other optional compounding agents are kneaded with a Banbury mixer, a kneader or an open roll and then vulcanized to obtain the rubber composition for a sidewall of the present invention.

The rubber composition for a sidewall of the present invention is used particularly for a sidewall among other tire members because of excellent weather resistance.

A tire can be produced by a usual method using the rubber composition for a sidewall of the present invention. Namely, the rubber composition for a sidewall of the present invention in which the aforementioned compounding agents are compounded according to necessity is extruded and processed into a shape of a sidewall of a tire at an unvulcanized stage and then is molded with other tire members by a usual method on a tire molding machine to obtain an unvulcanized tire. Then the unvulcanized tire is heated and pressurized in a vulcanizer to obtain a tire.

The tire prepared by using the rubber composition for a sidewall of the present invention can be made as an ecological tire, use of which makes it possible to consider an effect on environment and prepare for decrease in petroleum supply in future.

EXAMPLES

The present invention is explained in detail based on Examples, but the present invention is not limited only to these.

Various chemicals used in Examples and Comparative Examples are explained in detail in the following.

Natural rubber (NR): TSR 20.

Epoxidized natural rubber (ENR): ENR25 (an epoxidation ratio of 25% by mole) available from Kumpulan Guthrie Berhad Co. (Malaysia).

Silica: VN3 available from Degussa GmbH.

Calcium carbonate: Hakuenka CC available from Shiraishi Kogyo Kaisha, Ltd.

Graphite A: GR-15 (average particle diameter: 15 μm) available from Nippon Graphite Industries, Co., Ltd.

Graphite B: ACB-100 (average particle diameter: 80 μm) available from Nippon Graphite Industries, Co., Ltd.

Silane coupling agent: Si69 (bis(3-triethoxysilylpropyl)tetrasulfide) available from Degussa GmbH.

Wax: OZOACE 0355 available from NIPPON SEIRO CO., LTD.

Antioxidant: ANTIGENE 6C (N-(1,3-dimethylbutyl)-N'-phenyl-p-phenylenediamine) available from Sumitomo Chemical CO., LTD.

Stearic acid: STEARIC ACID "TSUBAKI" available from NOF CORPORATION.

Zinc oxide: available from Mitsui Mining & Smelting Co., Ltd.

Sulfur: SULFUR POWDER available from Tsurumi Chemical Industry Co., Ltd.

Vulcanization accelerator: NOCCELER NS (N-tert-butyl-2-benzothiazolylsulfenamide) available from OUCHI SHINKO CHEMICAL INDUSTRIAL CO., LTD.

Examples 1 to 6 and Comparative Examples 1 to 7

Chemicals other than sulfur and a vulcanization accelerator were kneaded under the condition of 80 rpm for 4 minutes according to the compounding prescription shown in Table 1 until the temperature reached 140° C. using a 1.7 L Banbury mixer manufactured by Kobe Steel Ltd., to obtain kneaded products. Sulfur and a vulcanization accelerator were added to the obtained kneaded products, and kneaded under the condition of 80° C. for 3 minutes using an open roll, to obtain unvulcanized rubber compositions. Further, the unvulcanized rubber compositions were subjected to press-vulcanizing under the condition of 150° C. for 20 minutes to obtain the vulcanized rubber sheets of Examples 1 to 6 and Comparative Examples 1 to 7.

(Tear Strength)

Tear strength (N/mm) was measured in accordance with the test method described in JIS K6252 "Rubber, vulcanized or thermoplastics-Determination of tear strength" by using angle type test pieces having no notching that were prepared from the vulcanized rubber sheets. The tear strength index of Comparative Example 1 was referred to as 100 and the tear strength of each compounding was calculated by the following equation and represented by an index. The larger the tear strength index is, the larger and more preferable the tear strength is.

(Tear strength index)=(Tear strength of each compounding)÷(Tear strength of Comparative Example 1)×100

(Flex Crack Growth Resistance)

Bending test was continuously conducted at 25° C. using the vulcanized rubber sheet in accordance with JIS K6260 "Testing method of flex cracking and crack growth for rubber, vulcanized or thermoplastic (De Mattia)" in such a manner that a percentage of elongation was 70% on the basis of the length of the original vulcanized rubber sheet, and the number of bending times until fracture of 1 mm was generated in the vulcanized rubber sheet was measured to calculate its logarithm. Then, a flex crack growth resistance index of Comparative Example 1 was referred to as 100 and the logarithm of the number of bending times of each compounding was represented as an index according to the following equation. The larger the flex crack growth resistance index is, the more hardly a crack grows and the more superior the flex crack growth resistance is.

(Flex crack growth resistance index)(Logarithm of the number of bending times of each compounding)÷(Logarithm of the number of bending times of Comparative Example 1)×100

(Weather Resistance)

Ozone resistance test was conducted in accordance with the test method described in JIS K6259 "Rubber, vulcanized or thermoplastics—Determination of ozone resistance". Namely, after continuously exposing the test pieces for 96 hours under the conditions of 40° C., an ozone concentration of 50±5 pphm and a tension quantity of 40%, the exposed test pieces were taken out from a test vessel and a state of cracking was observed for the number of cracks and size of cracks based on the following evaluation criteria.

Grading is represented based on the number and size of cracks.

A→C (the number of cracks)

A: Small number of cracks

B: Large number of cracks

C: Numerous cracks

1→5 (size and depth of cracks)

1: Cracks cannot be visually confirmed but can be confirmed by a 10-fold magnifying glass.

2: Cracks can be visually confirmed.

3: Cracks are deep and relatively large (less than 1 mm).

4: Cracks are deep and large (1 mm to 3 mm)

5: There are cracks exceeding 3 mm, or on the brink of cutting.

Evaluation results of the above-mentioned tests are shown in Table 1.

TABLE 1

|  | Example | | | | | | Com. Ex. | | | | | | |
| --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 |
| Amounts (part by weight) | | | | | | | | | | | | | |
| NR | 100 | 80 | 40 | 80 | 80 | 80 | 100 | 20 | 100 | 100 | 80 | 80 | 100 |
| ENR | — | 20 | 60 | 20 | 20 | 20 | — | 80 | — | — | 20 | 20 | — |
| Silica | — | — | — | — | 20 | 40 | — | — | — | — | — | 70 | — |
| Calcium carbonate | 60 | 60 | 60 | 60 | 40 | 40 | 10 | 60 | 150 | 60 | 60 | 50 | 60 |
| Graphite A | 10 | 10 | 10 | 40 | 10 | 10 | 10 | 10 | 10 | 60 | — | — | 3 |
| Graphite B | — | — | — | — | — | — | — | — | — | — | 40 | — | — |
| Silane coupling agent | — | — | — | — | 2 | 4 | — | — | — | — | — | 7 | — |
| Wax | 1.2 | 1.2 | 1.2 | 1.2 | 1.2 | 1.2 | 1.2 | 1.2 | 1.2 | 1.2 | 1.2 | 1.2 | 1.2 |
| Antioxidant | 2.4 | 2.4 | 2.4 | 2.4 | 2.4 | 2.4 | 2.4 | 2.4 | 2.4 | 2.4 | 2.4 | 2.4 | 2.4 |
| Stearic acid | 2.5 | 2.5 | 2.5 | 2.5 | 2.5 | 2.5 | 2.5 | 2.5 | 2.5 | 2.5 | 2.5 | 2.5 | 2.5 |
| Zinc oxide | 3 | 3 | 3 | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 | 1.5 | 1.5 | 1.5 |
| Vulcanization accelerator | 0.7 | 0.7 | 0.7 | 0.7 | 0.7 | 0.7 | 0.7 | 0.7 | 0.7 | 0.7 | 0.7 | 0.7 | 0.7 |
| Evaluation Results | | | | | | | | | | | | | |
| Tear strength index | 135 | 125 | 115 | 120 | 135 | 140 | 100 | 80 | 80 | 90 | 70 | 100 | 135 |
| Flex crack growth resistance index | 180 | 190 | 210 | 180 | 135 | 180 | 100 | 60 | 60 | 50 | 45 | 70 | 130 |
| Weather resistance | A2 | A2 | A2 | A1 | A2 | A2 | A2 | B2 | B3 | A1 | A1 | C4 | C2 |

INDUSTRIAL APPLICABILITY

According to the present invention, there can be provided a rubber composition for a sidewall comprising specified amounts of a specific rubber component, a white filler and a specific graphite, thereby making it possible to consider an effect on environment, prepare for decrease in petroleum supply in future, and further improve tear strength, flex crack growth resistance and weather resistance, and a tire having a sidewall prepared by using it.

The invention claimed is:

1. A rubber composition for a sidewall, which comprises:
15 to 120 parts by weight of a white filler, and
5 to 50 parts by weight of a graphite having an average particle diameter of 3 to 50 μm on the basis of 100 parts by weight of a rubber component comprising a natural rubber in an amount of not less than 30% by weight, wherein the rubber component comprises an epoxidized natural rubber in an amount of 10 to 70% by weight.

2. The rubber composition for a sidewall of claim 1, wherein said white filler is a silica and the silica is present in an amount of 15 to 60 parts by weight on the basis of 100 parts by weight of the rubber component.

3. A tire having a sidewall prepared by using the rubber composition for a sidewall of claim 1.

4. A tire having a sidewall prepared by using the rubber composition for a sidewall of claim 2.

5. The rubber composition for a sidewall of claim 1, wherein:
the white filler is present in an amount of 30 to 80 parts by weight on the basis of 100 parts by weight of a rubber component;
the graphite is present in an amount of 10 to 30 parts by weight on the basis of 100 parts by weight of a rubber component and has an average particle diameter of 5 to 20 μm; and
the epoxidized natural rubber is present in an amount of 20 to 60% by weight.

6. A tire having a sidewall prepared by using the rubber composition for a sidewall of claim 5.

* * * * *